Feb. 8, 1938. L. BODDY 2,107,560
ELECTRICAL INDICATING SYSTEM AND APPARATUS
Filed Sept. 15, 1936 2 Sheets-Sheet 1

INVENTOR.
LEONARD BODDY,
BY Slough & Canfield
ATTORNEYS

LEONARD BODDY, INVENTOR.

Patented Feb. 8, 1938

2,107,560

UNITED STATES PATENT OFFICE

2,107,560

ELECTRICAL INDICATING SYSTEM AND APPARATUS

Leonard Boddy, Ann Arbor, Mich., assignor to The Anderson Company, Gary, Ind., a corporation of Indiana Application September 15, 1936, Serial No. 100,917

10 Claims. (Cl. 171—95)

This invention relates to electrical indicating systems and apparatus and more particularly to a receiving or indicating unit for such systems.

I am familiar with electrical indicating systems wherein an indicating unit quantitatively registers temperature, pressure, or liquid level, through a transmitting device disposed at the point of manifestation of the physical condition and connected in circuit with the indicating unit. An arm of the indicating unit is movable over the dial in correspondence with current intensity which in turn is controlled by the transmitter in correspondence with fluctuations in temperature, pressure, liquid level and the like. Indicating systems of this type are commonly used on automotive vehicles wherein it is desired to use a minimum amount of current necessitating sensitive mechanism parts which ordinarily are difficult of adjusting initially and also are difficult to maintain in proper adjustment. The vibration, to which the parts are subjected when used on automotive vehicles, is to a large degree responsible for the improper functioning of such apparatus. In the instant application, I have described a receiving or indicating unit which is simple in construction and operation, the parts are so mounted as to be relatively unaffected by vibration, and the unit may be easily and quickly adjusted initially and after a period of use.

It is an object of my invention therefore to provide an indicating unit adapted to an electrical indicating system which is relatively accurate although economical in construction and simple in operation.

Another object of my invention is to provide an indicating unit adapted to be applied to an electrical indicating system which may be easily adjusted initially to give proper reading in correspondence with current variations from a transmitter unit and which may be easily readjusted after a period of operation, if required.

Another object of my invention is to provide an indicating unit for an electrical indicating system which is sensitive in operation but is relatively unaffected by vibration.

Another object of my invention is to provide an indicating unit of the above type which is unaffected by variations in ambient temperature.

Another object of my invention is to provide an indicating unit of the above type adapted to automotive vehicles and the like and which is unaffected by the normal voltage variations encountered in such use.

Other objects of my invention and the invention itself will become increasingly apparent from a consideration of the following description and drawings, wherein:—

Figure 1:
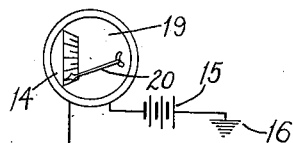
Fig. 1 is a diagrammatic view of an indicating system employing my invention.
Figure 2:
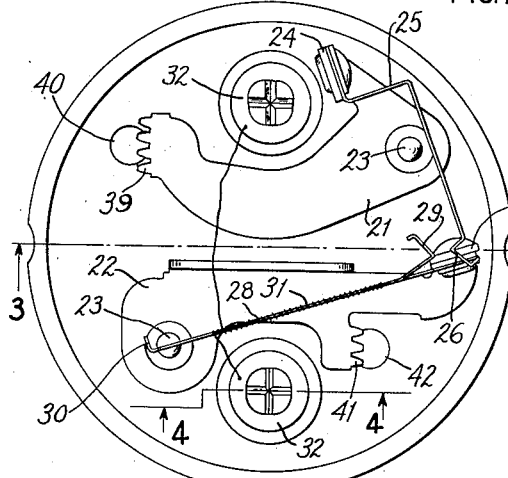
Fig. 2 is a top plan view of the indicating unit of Fig. 1 with the cover plate and indicating arm removed.
Figure 3:
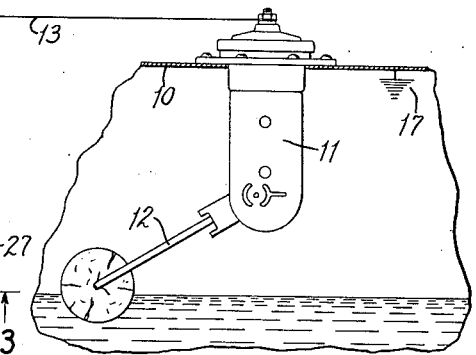
Fig. 3 is a section taken along the line 3—3 of Fig. 2.
Figure 3:
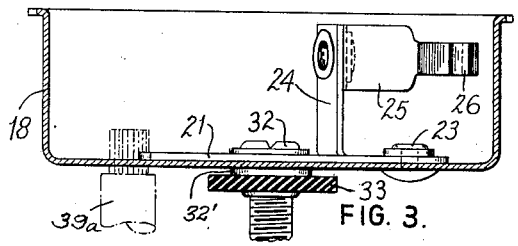
Figure 5:
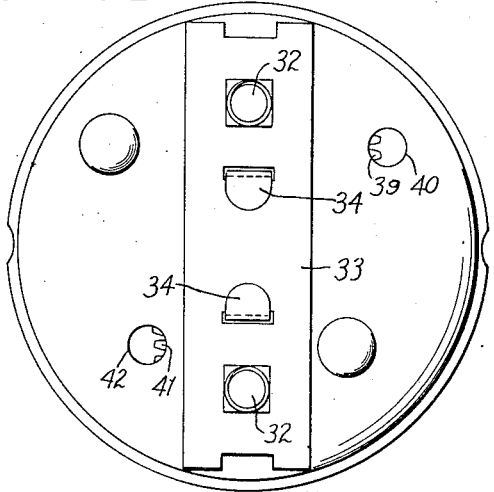
Fig. 5 is a bottom plan view of the indicating unit of Fig. 1.
Figure 4:
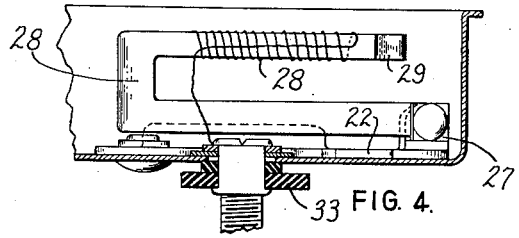
Fig. 4 is a fragmentary section taken along the line 4—4 of Fig. 2.

Referring now to the drawings, I have indicated at 10 the top wall of the liquid container such as the gas tank of an automotive vehicle. The wall 10 is perforated for the reception of a transmitting unit generally indicated at 11 and comprising a float element 12 which is adapted to actuate electrical contacts in the transmitter to send a series of current impulses through a wire 13 to an indicating unit 14. Transmitters of this type which are adapted to send a continuous current of varying intensity dependent upon the position of an actuating element or, a series of current impulses whose cumulative value is dependent upon the position of an actuating element are well known, in the art.

Although I have illustrated the actuating element as comprising a float arm movable by changes of liquid level, it is understood that any actuating means such as a pressure responsive diaphragm or the like may be employed and that the indicating unit 14 is equally adaptable to indicate pressure, temperature and the like. Current flows from a battery 15 through the indicating unit 14, wire 13, and transmitter 11, the circuit being completed by a ground for the battery indicated at 16 and a ground for the transmitter indicated at 17. The manner of installing electrical indicating systems on automotive vehicles is well known and a further description is not believed necessary.

The indicating unit 14 comprises a cup shaped housing 18 having a suitable cover plate 19 including an indexed portion perforated so that an indicating arm 20 may be projected therethrough to travel along the indexed portion of the plate. The plate and the manner of indication constitutes no essential part of my invention and may be altered as desired.

The base of housing 18 has pivotally mounted therein arms 21 and 22, each of said arms being perforated and a headed pin 23 projected through the perforation and flanged over in abutting relation with the housing base. The arms 21 and 22 are not freely movable but will remain in an adjusted position despite the normal vibration and shock encountered when the unit is employed on an automotive vehicle or the like. The arm 21 is provided with an upstanding leg 24 to which is rigidly secured a generally Z-shaped metal strip 25 having a hooked end portion 26; the end portion 26 being substantially reduced for a purpose to be later described.

Arm 22 is provided with an upstanding finger 27 to which is rigidly secured one end of a generally U-shaped bi-metallic element 28, the opposite end of the bi-metallic element terminating in a hooked portion 29 and to provide additional stiffness the U web may be bent as indicated at 30. The upper and lower arms of the bi-metallic element are adapted to bend substantially equally responsive to changes in ambient temperature whereby the position of the hooked end portion 29 of the bi-metallic element will be relatively unaffected by ambient temperature changes. That is, the lower leg of the bi-metallic element 28 will warp in a given direction upon an increase in ambient temperature, thereby correspondingly moving the web portion and the upper arm, but since the upper arm also warps substantially the same amount as the lower arm and in the opposite sense, the position of the hook portion 29 thereof will be unchanged.

Encircling the upper arm of the bi-metallic element 28 and insulated therefrom is a heating coil 31 having its ends electrically connected with terminals 32—32. Each terminal 32 is maintained insulated from the housing 18 by means of insulating washers and a fibre or the like insulating strip 33.

The terminals 32 have a square-headed portion which is projected through the fibre strip 33 and the insulating washers provided on each face of the housing base and the head is then flanged over to maintain the terminals secured to the housing. To further insure the terminals being rigidly maintained and in proper alignment the housing base may have ears 34 punched therefrom and bent over after being projected through the fibre strip 33. One terminal will be connected with the source of power such as the battery 15 and the other terminal with the wire 13 leading to the transmitter.

As current traverses the circuit under the control of the transmitter the coil 31 will become energized and heat the upper arm of element 28 which it encircles causing the arm to warp in a counter-clockwise direction in correspondence with the heating effect of the current. This heating effect may be caused by a continuous current of varying intensity or a series of current pulsations of varying value and I preferably employ a transmitter providing a series of current pulsations since the heating effect may be substantially the same for a given position of the float element 12 despite voltage variations of the battery. The transmitter is so designed that an increase in voltage although increasing the heating effect of an individual current impulse causes the impulses to be of shorter duration so that the cumulative heating effect is the same.

Figure 7:
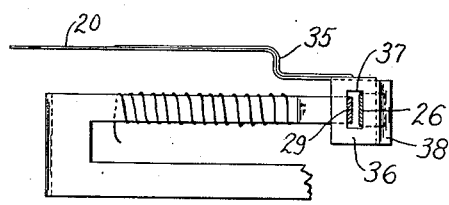
Fig. 7 is an elevational view from the plane 7—7 of Fig. 6.
Figure 6:
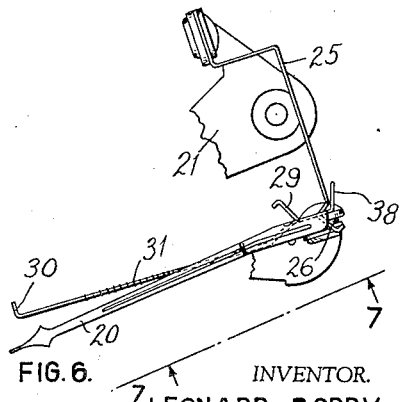
Fig. 6 is a fragmentary plan view showing the manner of supporting the indicating hand.
Figure 8:
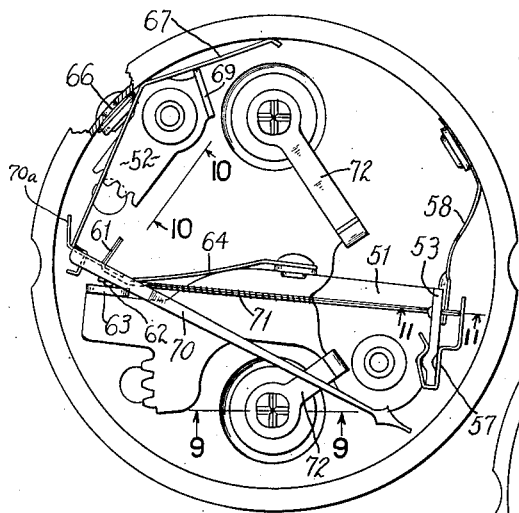
Fig. 8 is a top plan view of a modified form of indicating unit with the cover plate removed.
Figure 11:
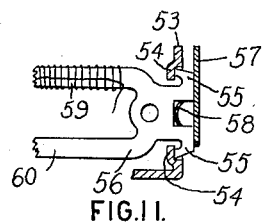
Fig. 11 is a fragmentary section along line 11—11 of Fig. 8.
Figure 12:
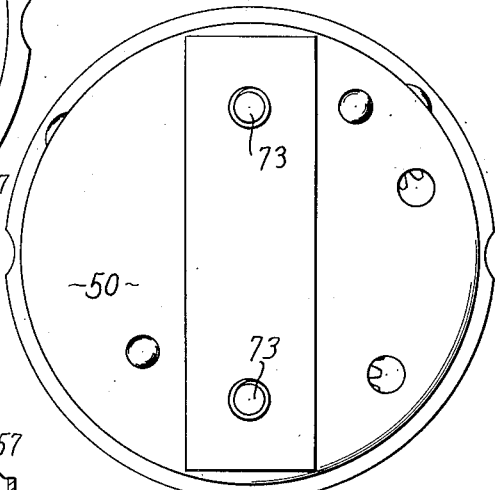
Fig. 12 is a bottom plan view of the indicating unit of Fig. 8.
Figure 9:
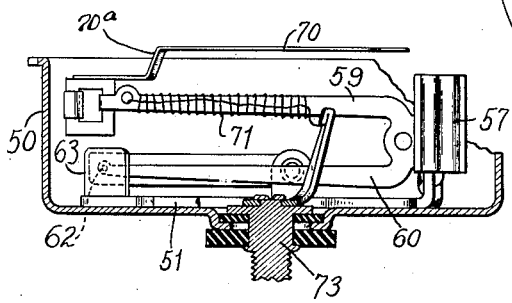
Fig. 9 is a fragmentary section taken generally along the line 9—9 of Fig. 8.
Figure 10:
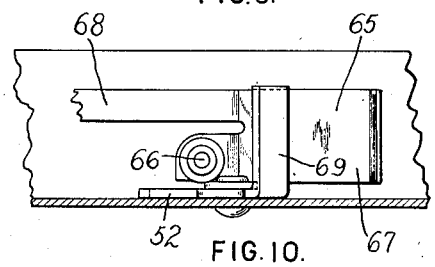
Fig. 10 is a fragmentary section along line 10—10 of Fig. 8.

The indicating arm 20 best illustrated in Figs. 6 and 7 is made of relatively light metal and comprises portions including the usual pointer disposed externally of plate 19 and a portion within the housing, the arm having a right angle bend as indicated at 35 interconnecting the externally and internally disposed portions. The internally disposed portion of the arm terminates in a vertically disposed generally rectangular portion 36 provided with an elongated perforation 37 and including an angularly disposed tail 38.

The hooked end portion 26 of strip 25 and the hooked end portion 29 of bimetallic element 28 are projected through the perforation 37 to support the indicating arm with the V of said end portions forming substantially knife edge connection with the end portion 36 of the arm. The strip 25 is resilient and maintains sufficient tension to prevent undue fluctuation of the arm due to vibration and the like. It will be noted that the position of the arm may be altered both by moving the strip 25 and the bimetallic element 28 to effect an adjustment in either direction of the indicating arm.

To move the strip 25 the arm 21 is provided with teeth 39 engageable by a tool 39a having a geared portion adapted to be projected through a perforation 40 provided in the housing base and engage the teeth to effect rotary movement of arm 21 about its pivotal support and consequently move the strip 25 and alter the position of the hooked end portion 26 engaging the indicating arm. Therefore, by adjusting the tension on strip 25 as described, the throw of the indicating arm for any given temperature may be varied.

In like manner, the arm 22 is provided with teeth 41 also engageable by tool 39a upon projection of the geared portion of the tool through a perforation 42 in the housing base. Thus, a simple adjustment means is provided accessible externally of the housing permitting adjustment to be made after assembly of the indicating unit and also permitting easy adjustment at any period subsequent to the initial factory adjustment.

To test the indicating unit 14 it will be connected substantially as illustrated in Fig. 1 with a master transmitter and the position of the indicating arm corresponding to the lowermost or empty position of the float arm 12 will be observed and if necessary the arm position can be altered through the adjustment means described. Similarly the position of the indicating arm corresponding to the uppermost position of the float arm will be observed and any necessary adjustment made.

Referring now to Figs. 8 to 12 inclusive, I have a modified form of indicating unit generally similar to that illustrated in Figs. 1 to 7 inclusive, but wherein a different mounting for the bi-metallic element is provided.

A cup-form housing 50 pivotally supports arms 51 and 52, the arm 51 having an upstanding notched leg 53. The notch is in the form of a rectangle, and above and below the notch the leg is indented as indicated at 54—54 for the reception of prongs 55—55 of a fork bi-metallic element 56. The bi-metallic element 56 is maintained in contact with the leg 53 by means of a clip 57 snapped over a portion of the leg and having a finger resiliently pressing on the rear face of the bi-metallic element.

To further insure the bi-metallic element being maintained in proper contact with the leg 53, a spring element 58 is secured to the housing side wall by one end and its opposite end is projected within the notch formed in the end of the bi-metallic element and resiliently presses against the bi-metallic element.

The bi-metallic element 56 comprises an upper arm 59 and a lower arm 60. The upper arm 59 has a freely movable hook end, as indicated at 61, and the lower arm at its free end is provided with a button 62 extending therethrough and which is engaged on opposite sides by an abutment 63 formed on the arm 51 and a resilient strap element 64 secured to the arm 51, thereby maintaining the free end of the lower arm 60 in a substantially fixed position relative to the arm 51, but permitting the lower arm 60 to freely warp.

The lower arm 60, upon an increase in ambient temperature, is adapted to warp or arch downwardly or in a counter-clockwise direction, tending to move the hook end 61 of the upper arm 59 downwardly or in a counter-clockwise direction, but since the upper arm 59 is equally effected by ambient temperature and arches in the same manner as the lower arm 60, the net result is that the hook free end 61 of the upper arm 59 remains substantially fixed with slight variation in ambient temperature.

A resilient element 65, preferably formed of copper, comprises a portion by which the bi-metallic unit is secured to the wall of the housing 50 by riveting, as indicated at 66, a relatively wide portion 67 abutting the inner wall of the housing 50 at spaced points and a relatively narrow portion 68 having a hook on its unsupported or free end.

Abutting the portion 67 of the element 66 is an upstanding leg 69 of the arm 52, whereby movement of the arm effected by a gear tool projected through the housing base, will alter the relation of portion 67 with the housing wall and correspondingly move the hooked end of the portion 68. The hooked end 61 of the upper arm 59 of the bi-metallic element and the hooked end of the element 65 are projected through a perforated portion of an indicating arm 70 to support the indicating arm in a manner previously described. Arm 70 is preferably provided with an angularly disposed portion 70A to act as a stiffening means for the perforated portion.

Each of the hook portions engage the indicating arm with a susbtantially knife-edge contact, providing two pivotal supporting points so that adjustment of either the bi-metallic element through movement of its supporting arm 51, or element 65 through movement of arm 52, will relatively move the indicating arm 70 to adjust the same.

A heating coil 71 is formed by a wire encircling the upper arm 59 of the bi-metallic element, and the wire ends are connected with upstanding contact arms 72—72 secured to terminals 73—73, whereby current may traverse the heating coil under the control of the transmitter.

Although I have shown and described modifications of my invention, I contemplate that numerous and extensive departures may be made therefrom without departing from the spirit of my invention and the scope of the appended claims.

Having thus described my invention, I claim:

1. An indicating unit adapted to be included in circuit with a source of power and a transmitter in an electrical indicating system, said unit comprising a housing adapted to be mounted on a support, a pair of members pivotally mounted on the housing base, one of said members including an upstanding portion having spaced depressions formed therein, a generally U-shaped bi-metallic element having hooked portions formed on the U-web seated within the depressions, means maintaining the hooked portions within the depressions, the upper arm of the bi-metallic element having a generally V-shaped free end portion, a resilient member secured to the housing having a generally V-shaped hooked free end portion, an indicating arm perforated to receive the free end portions of the upper bi-metallic arm and the resilient member whereby the indicating arm is supported about two substantially parallel pivotal axes, and means accessible externally of the housing for actuating the said pair of members to alter the position of the indicating arm for a given force exerted thereon by warping of the upper arm of the bi-metallic element.

2. An indicating unit adapted to be included in circuit with a source of power and a transmitter in an electrical indicating system, said unit comprising a housing adapted to be mounted on a support, a pair of members pivotally mounted on the housing base, one of said members including an upstanding portion having spaced depressions formed therein, a generally U-shaped bi-metallic element having hooked portions formed on the U web seated within the depressions, means maintaining the hooked portions within the depressions and permitting pivotal movement of the bi-metallic element relative to said upstanding portion, the upper arm of the bi-metallic element having a generally V-shaped free end portion, a resilient member secured to the housing having a generally V-shaped free end portion, an indicating arm perforated to receive the free end portions of the upper bi-metallic arm and the resilient member whereby the indicating arm is supported about two substantially parallel pivotal axes, resilient means maintaining the free end portion of the bi-metallic element lower arm in abutting relation with its associated supporting member on one of said pair of members, the other of said pair of members being adapted to effect movement of the resilient member free end portion, and means accessible externally of the housing for actuating said pair of members to alter the position of the indicating arm for a given force exerted thereon by warping of the upper arm of the bi-metallic element.

3. The indicating unit as described in claim 2 and wherein electrical heating means are movingly associated with the upper arm of the bi-metallic element, whereby said arm will be warped in correspondence with the heating value of the heating means.

4. An electrical indicator comprising a fixed support, a thermally responsive element comprising a pair of bi-metallic thermally warpable arms and an intermediate yoke, said arms extending in the same generally lateral direction from said yoke, spring means to maintain said yoke so positioned as to rock on a surface of said support, an electrical heating element thermally associated with one of said arms, and an indicating element variably movably responsive to relatively differential thermally effected warping movements of one of said arms with respect to the other arm.

5. An electrical indicator comprising a fixed support, a thermally responsive element comprising a pair of bi-metallic thermally warpable arms and an intermediate yoke, said arms extending in the same generally lateral direction from said yoke, spring means to maintain said yoke so positioned as to rock on a surface of said support, an electrical heating element thermally associated with one of said arms, an indicating element variably movably responsive to relatively differential thermally effected warping movements of one of said arms with respect to the other arm, said yoke comprising a portion extending in the direction of said arms, and said yoke portions being pressed in the general direction of said arms against a portion of said support by said spring means.

6. An electrical indicator comprising a fixed support, a thermally responsive element comprising a pair of bi-metallic thermally warpable arms and an intermediate yoke, said arms extending in the same generally lateral direction from said yoke, spring means to maintain said yoke so positioned as to rock on a surface of said support, an electrical heating element thermally associated with one of said arms, an indicating element variably movably responsive to relatively differential thermally effected warping movements of one of said arms with respect to the other arm and the said rockable portion of said yoke comprising two spaced prongs.

7. An electrical indicator comprising a fixed support having recesses therein, a thermally responsive element comprising a pair of bi-metallic thermally warpable arms and an intermediate yoke, said arms extending in the same generally lateral direction from said yoke, spring means to maintain said yoke so positioned as to rock on a surface of said support, an electrical heating element thermally associated with one of said arms, an indicating element variably movably responsive to relatively differential thermally effected warping movements of one of said arms with respect to the other arm, the said rockable portion of said yoke comprising two spaced prongs, and said prongs being projected within recesses of said supports.

8. An electrical indicator comprising a fixed support, a thermally responsive element comprising a pair of bi-metallic thermally warpable arms and an intermediate yoke, said arms extending in the same generally lateral direction from said yoke, spring means to maintain said yoke so positioned as to rock on a surface of said support, an electrical heating element thermally associated with one of said arms, an indicating element variably movably responsive to relatively differential thermally effected warping movements of one of said arms with respect to the other arm, and guard means carried by said support at the opposite side of said yoke from its support engaging rocking portion to prevent said yoke from becoming dislodged from its rocking engagement with said support.

9. An electrical indicator comprising a fixed support, a thermally responsive element comprising a pair of bi-metallic thermally warpable arms and an intermediate yoke, said arms extending in the same generally lateral direction from said yoke, spring means to maintain said yoke so positioned as to rock on a surface of said support, an electrical heating element thermally associated with one of said arms, an indicating element variably movably responsive to relatively differential thermally effected warping movements of one of said arms with respect to the other arm, said indicating element being rotatable about an axis to give indications of electrically effected temperature increases of said electrically heated arm, and motion multiplying means engaged by a free end of said heated arm for rotating said indicating element.

10. An electrical indicator comprising a fixed support, a thermally responsive element comprising a pair of bi-metallic thermally warpable arms and an intermediate yoke, said arms extending in the same generally lateral direction from said yoke, spring means to maintain said yoke so positioned as to rock on a surface of said support, an electrical heating element thermally associated with one of said arms, an indicating element variably movably responsive to relatively differential thermally effected warping movements of one of said arms with respect to the other arm, and means for adjusting the degree of movement of said indicating element responsive to varying degrees of temperature electrically imparted to said thermally associated arm.

LEONARD BODDY.